United States Patent [19]

Patel et al.

[11] Patent Number: 5,693,698

[45] Date of Patent: Dec. 2, 1997

[54] COMPOSITIONS COMPRISING AN ACRYLAMIDE-CONTAINING POLYMER AND PROCESS THEREWITH

[75] Inventors: Bharat B. Patel, Bartlesville, Okla.; T. George Muller, Coffeyville, Kans.

[73] Assignee: Phillips Petroleum Company, Bartlesville, Okla.

[21] Appl. No.: 453,418

[22] Filed: May 30, 1995

Related U.S. Application Data

[62] Division of Ser. No. 392,457, Feb. 21, 1995, Pat. No. 5,648,075.

[51] Int. Cl.$^6$ .............. C08K 5/06; C09K 7/02; C08F 228/02; E21B 21/04
[52] U.S. Cl. .............. 524/386; 524/9; 524/13; 524/436; 524/445; 524/446; 524/447; 524/448; 524/514
[58] Field of Search .............. 524/386, 436, 524/445, 446, 447, 448, 9, 13, 514

[56] References Cited

U.S. PATENT DOCUMENTS

| | | | |
|---|---|---|---|
| 3,502,149 | 3/1970 | Pence | 166/295 |
| 3,723,311 | 3/1973 | Lummus et al. | 252/8.5 A |
| 3,818,998 | 6/1974 | Hessert | 175/72 |
| 4,293,427 | 10/1981 | Lucas et al. | 252/8.5 C |
| 4,425,241 | 1/1984 | Swanson | 252/8.5 C |
| 4,455,240 | 6/1984 | Costello | 252/8.5 C |
| 4,561,985 | 12/1985 | Glass, Jr. | 252/8.5 A |
| 4,589,489 | 5/1986 | Volz et al. | 166/274 |
| 4,622,373 | 11/1986 | Bardollwalla | 526/240 |
| 4,770,795 | 9/1988 | Giddings et al. | 252/8.514 |
| 4,830,765 | 5/1989 | Perricone et al. | 252/8.51 |
| 4,941,981 | 7/1990 | Perricone et al. | 252/8.51 |
| 4,963,273 | 10/1990 | Perricone et al. | 252/8.51 |
| 5,028,342 | 7/1991 | Opitz et al. | 252/8.513 |
| 5,045,588 | 9/1991 | Arranaga | 524/445 |
| 5,076,373 | 12/1991 | Hale et al. | 175/40 |
| 5,134,118 | 7/1992 | Patel et al. | 507/121 |
| 5,135,909 | 8/1992 | Stephens et al. | 507/121 |

FOREIGN PATENT DOCUMENTS

| | | | |
|---|---|---|---|
| 0058917 | 9/1982 | European Pat. Off. | C09K 7/02 |
| 0668339 | 8/1995 | European Pat. Off. | C09K 7/00 |
| 2624132 | 6/1989 | France | C09K 7/02 |
| 2245292 | 1/1992 | United Kingdom | C09K 7/02 |

*Primary Examiner*—Kriellion S. Morgan
*Attorney, Agent, or Firm*—Lucas K. Shay

[57] ABSTRACT

A composition is provided which comprises an acrylamide-containing polymer comprising repeat units derived from at least two monomers, a polypropylene glycol, and optionally, a polysaccharide. Also provided is a water-based composition which can be used as drilling fluid wherein the composition comprises calcium chloride, an acrylamide-containing polymer which has repeat units derived from at least two monomers, a polypropylene glycol, and optionally, a polysaccharide. Additionally, a process for using a water-based fluid which has the characteristics of an oil-based fluid as to use in drilling a gumbo shale or highly hydratable formation is provided wherein the process comprises contacting the shale or formation with a composition comprising calcium chloride, an acrylamide-containing polymer, a polypropylene glycol, and optionally, a polysaccharide wherein the acrylamide-containing polymer, polypropylene glycol, and polysaccharide are each present in a sufficient amount to effect the control of fluid loss of a water-based composition.

34 Claims, No Drawings

COMPOSITIONS COMPRISING AN ACRYLAMIDE-CONTAINING POLYMER AND PROCESS THEREWITH

This application is a divisional of application Ser. No. 08/392,457, filed Feb. 21, 1995, now U.S. Pat. No. 5,684,075.

The present invention relates to a composition comprising an acrylamide-containing polymer and a process for using the composition.

BACKGROUND OF THE INVENTION

Water-based fluids such as, for example, drilling fluids, milling fluids, mining fluids, water-based metal working fluids, food additives and water-based paints, are useful in a variety of industrial applications. It is well known to those skilled in the art of drilling wells to tap subterranean deposits of natural resources, such as gas, geothermal steam or oil, especially when drilling by the rotary method or the percussion method wherein cuttings must be removed from the bore hole, it is necessary to use a drilling fluid.

The use of water-based fluids in, for example, workover and completion fluids in oil field operations is also well known to those skilled in the art. Workover fluids are those fluids used during remedial work in a drilled well. Such remedial work includes removing tubing, replacing a pump, cleaning out sand or other deposits, logging, etc. Workover also broadly includes steps used in preparing an existing well for secondary or tertiary recovery such as polymer addition, micellar flooding, steam injection, etc.

Completion fluids are those fluids used during drilling and during the steps of completion, or recompletion, of the well. Completion operation can include perforating the casing, setting the tubing and pump, etc. Both workover and completion fluids are used in part to control well pressure, to stop the well from blowing out while it is being completed or worked over, or to prevent the collapse of casing from over pressure.

Oil-based, or hydrocarbon-based, drilling fluids have been generally used for drilling highly hydratable formations, or gumbo shales. However, these oil- or hydrocarbon-based drilling fluids which contain at least a hydrocarbon as liquid carrier cannot be used in some areas where environmental regulations are of concern. Water-based drilling fluids would therefore be the fluids of choice.

Although many water-based drilling fluids have been used to drill through gumbo shales or highly hydratable formations, none has performed as well as oil- or hydrocarbon-based fluids. Even though recently some synthetic liquid-based fluids containing esters, polyolefins, or glycols have been used in drilling the gumbo shales or highly hydratable formations with limited success, these liquid-based fluids are generally not cost effective because they are too expensive.

Additionally, many additives for water-based fluids were found to effectively provide fluid loss control, increase viscosity, inhibit drill solids, or combinations of two or more thereof, of the water-based fluids when the fluids are used in drilling a subterranean formation and contain less than about 2000 mg/l of calcium chloride. However, as the calcium chloride concentration increases, the effectiveness of these additives, especially for maintaining rheology and water loss control, decreases significantly. It is, therefore, highly desirable to develop an improved water-based fluid, or an additive thereof, and a process for using these fluids or additives.

SUMMARY OF THE INVENTION

An object of the present invention is to provide an additive useful in a water-based fluid. A further object of the invention is to provide a water-based fluid having the characteristics of an oil-based fluid useful in drilling a gumbo shale or highly hydratable formation. Another object of the invention is to provide a water-based fluid for use as drilling fluid. Still another object of the invention is to provide a composition which can be used as drilling fluid wherein the drilling fluid contains at least 1,000, preferably 5,000, more preferably 10,000, even more preferably, 25,000, and most preferably 50,000 mg/l of calcium chloride. Other objects, advantages, and features will become more apparent as the invention is more fully disclosed hereinbelow.

According to a first embodiment of the present invention, a composition is provided which comprises an acrylamide-containing polymer which contains repeat units derived from at least two monomers, a polypropylene glycol, and, optionally, a polysaccharide wherein the acrylamide-containing polymer, polyproylene glycol, and polysaccharide are each present in a sufficient amount to effect the control of fluid loss of a water-based composition.

According to a second embodiment of the present invention, a water-based composition which can be used as drilling fluid is provided wherein the composition comprises calcium chloride, an acrylamide-containing polymer which has repeat units derived from at least two monomers, a polypropylene glycol, and, optionally, a polysaccharide wherein the acrylamide-containing polymer, polyproylene glycol, and polysaccharide are each present in a sufficient amount to effect the control of fluid loss of a water-based composition.

According to a third embodiment of the present invention, a process for using a water-based fluid which has the characteristics of an oil-based fluid as to use in drilling a gumbo shale or highly hydratable formation is provided. The process comprises contacting the shale or formation with a composition comprising calcium chloride, an acrylamide-containing polymer, a polypropylene glycol, and optionally, a polysaccharide wherein the acrylamide-containing polymer, polyproylene glycol, and polysaccharide are each present in a sufficient amount to effect the control of fluid loss of a water-based composition.

DETAILED DESCRIPTION OF THE INVENTION

According to the first embodiment of the invention, a fluid additive is provided. The additive comprises an acrylamide-containing polymer having repeat units derived from at least two monomers, a polypropylene glycol, and a polysaccharide. The term "hydratable formation" is used herein as, unless otherwise indicated, gumbo shales. The term "gumbo shale" as used in the present invention, unless otherwise indicated, refers to soft and easily dispersible formation which forms highly plastic and sticky masses when wet.

According to the first embodiment of the invention, the acrylamide-containing polymer can be any acrylamide-containing polymer that inhibits shale dispersion, or increases the viscosity of the water under ambient conditions, or both. The term "polymer" used herein denotes, unless otherwise indicated, a copolymer, a terpolymer, a tetrapolymer, or combinations of any two or more thereof.

Suitable acrylamide-containing polymers are thermally stable polymers of acrylamide and at least one olefinic comonomer. Generally, any olefinic comonomer which can be co-polymerized with acrylamide can be used in the present invention. Examples of suitable olefinic comonomers include, but are not limited to, R—C(R)=C(R)—C(O)—C(R)(R), R—C(R)=C(R)—C(O)—N(R)—Y—R, R—C(R)=C(R)—C(O)—G—Y—Z, R—C(R)=C(R)—C(O)—G—Y—W, $CH_2$=CH—C(O)—N(R)—$(CH_2)_n$—$CH_3$, and combinations of any two or more thereof where each R can be the same or different and is each selected from the group consisting of hydrogen, alkyl radicals, aryl radicals, aralkyl radicals, alkalkyl radicals, cycloalkyl radicals, and combinations of any two or more thereof wherein each radical can contain 1 to about 12 carbon atoms; G is O or NH; Y is an alkylene radical having 1 to about 10, preferably 1 to about 7, and most preferably 1 to 4 carbon atoms and can contain substituents selected from the group consisting of hydroxy group, halides, amino groups, alkyl radicals, aryl radicals, alkaryl radicals, aralkyl radicals, cycloalkyl radicals, and combinations of any two or more thereof wherein each carbon-containing radical has 1 to about 12 carbon atoms; W is an acid moiety selected from the group consisting of phosphonic acids, phosphoric acids, phosphinic acids, sulfuric acids, sulfonic acids, sulfurous acids, sulfinic acids, carboxylic acids, alkali metal salts of the acids, ammonium salts of the acids, and combinations of any two or more thereof; Z has a formula selected from the group consisting of N(R)(R), $N^+$(R)(R)(R)$X^-$, and combinations of any two or more thereof wherein R is the same as above and X can be any inorganic anion selected from the group consisting of sulfonates, sulfinates, sulfates, phosphonates, phosphinates, phosphates, halides, nitrates, and combinations of any two or more thereof; and n is a number of from 0 to about 10. More specific examples of suitable olefinic comonomers include, but are not limited to, vinyl acetate, vinylpyridine, styrene, methyl methacrylate, acryloylpiperazine, methacryloylpiperazine, methacryloylmorpholine, methacrylamide, acrylonitrile, methacrylic acid, ammonium salt of methacrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, vinylsulfonic acids, alkali metal salts of vinylsulfonic acid, styrene sulfonic acid, alkali metal salts of styrene sulfonic acid, N-vinyl-2-pyrrolidone, and combinations of any two or more thereof. The presently preferred comonomers are 2-acrylamido-2-methylpropane sulfonic acid, alkali metal salts of 2-acrylamido-2-methylpropane sulfonic acid, N-vinyl-2-pyrrolidone, or combinations of any two or more thereof. The presently preferred acrylamide-containing polymers are copolymers of N-vinyl-2-pyrrolidone and acrylamide, terpolymers of sodium 2-acrylamide-2-methylpropanesulfonate, acrylamide and N-vinyl-2-pyrrolidone, copolymers of sodium 2-acrylamido-2-methyl-2-propanesulfonate and acrylamide, and combinations of any two or more thereof for applications in high salinity environments at elevated temperatures. Selected terpolymers also are useful in the present process, such as terpolymers derived from acrylamide and N-vinyl-2-pyrrolidone comonomers with lesser amounts of termonomers such as vinyl acetate, vinylpyridine, styrene, methyl methacrylate, and other polymers containing acrylate groups. Generally, the mole percent of acrylamide is in the range of from about 15 to about 90%, preferably about 20 to about 85%, and most preferably 20 to 80%. Olefinic comonomer makes up the rest of the mole percent.

Suitable polysaccharides for use in the composition are those capable of increasing the viscosity, or controlling the water loss, or both, of the composition in aqueous form and include, but are not limited to, starches, gums, other biopolysaccharides, celluloses, and combinations of any two or more thereof.

Examples of suitable celluloses are those selected from the group consisting of carboxymethylcellulose, methylcellulose, carboxymethyl hydroxyethyl cellulose, hydroxypropyl methylcellulose, hydroxypropyl cellulose, hydroxyethyl cellulose, ethylhydroxy cellulose, and combinations of any two or more thereof.

Examples of suitable starches include those selected from the group consisting of carboxymethyl starch, hydroxyethyl starch, and hydroxypropyl starch, and combinations of any two or more thereof.

Examples of suitable gums are those selected from the group consisting of arabic, trajacanth, karaya, shatti, locust bean, guar, psyllium seed, quince seed, agar, algin, carrageenin, furcellaran, pectin, gelatin, and combinations of any two or more thereof.

The biopolysaccharides useful in this invention are biopolymers produced by a process comprising the microbial transformation of a carbohydrate with a microorganism to obtain a polymeric material which differs from the parent polymeric material in respect of composition, properties and structure. These are thoroughly discussed in U.S. Pat. No. 5,091,448, which is incorporated herein by reference.

The presently preferred polysaccharides are high viscosity hydroxyethyl cellulose polymer and carboxymethyl hydroxyethyl cellulose polymer for their ready availability.

Polypropylene glycols are commercially available glycol-based polymers. A polypropylene glycol is the product of a propylene oxide polymerization. Generally, a suitable polypropylene glycol can have a molecular weight in the range of from about 400 to about 7,500, preferably about 1,000 to about 6,000, more preferably about 1,200 to about 5,000, and most preferably 1,500 to 4,500. Furthermore, the polypropylene glycol polymer useful in the invention can also be a polypropylene glycol having one or more methyl groups attached to the propylene units of the polymer.

The weight percent of the individual components of the composition can be any weight percent so long as the additive can increase the viscosity, or control the water loss, or inhibit the drill solids, or combinations of any two or more thereof, of a water-based fluid and can vary widely depending on the desired applications. Generally the composition of the present invention can contain the acrylamide-containing polymer in the range of from about 10 to about 55, preferably from about 12.5 to about 50, and most preferably from 15 to 45 weight %; the polypropylene glycol polymer in the range of from about 20 to about 90, preferably about 30 to about 80, and most preferably 40 to 70 weight %; and the polysaccharide in the range of from about 1 to about 20, preferably about 1 to about 17.5, and most preferably 1 to 15 weight %. When the composition is used in a water-based fluid, the water-based fluid composition can contain the acrylamide-containing polymer in the range of from about 0.01 to about 10, preferably from about 0.05 to about 5, and most preferably from 0.1 to 3 weight %; the polypropylene glycol polymer in the range of from about 0.01 to about 20, preferably from about 0.05 to about 15, and most preferably from 0.1 to 10 weight %; the polysaccharide in the range of from about 0.01 to about 10, preferably from about 0.05 to about 5, and most preferably from 0.1 to 3 weight %; and water, as defined below, making up the rest of the composition.

The additive or composition can be made by a variety of mixing means known to one skilled in the art such as, for example, blending. The individual components can be mixed in any order. Because such mixing means are well known to one skilled in the art, the description is omitted herein for the interest of brevity.

The term "water" can be a pure water, a regular tap water, a solution, a suspension, or combinations of any two or more thereof wherein the solution or suspension contains dissolved, partially dissolved, or undissolved substances. The substances can be salts, clays, or combinations of any two or more thereof.

Examples of salts that can be present in a water-based fluid using the composition of the invention include, but are not limited to, alkali metal halides, alkaline earth metal halides, and combinations of any two or more thereof. Generally the total salts content in the water-based composition can vary widely from, for example, 5 to as high as 50 weight %. The typical total salts content can be in the range of from, for example, about 5 weight % to about 40 weight %.

Examples of suitable clays include but are not limited to kaolinite, halloysite, vermiculite, chlorite, attapulgite, smectite, montmorillonite, illite, saconite, sepiolite, palygorskite, Fuller's earth, and combinations of any two or more thereof. The presently preferred clay is palygorskite which is also known as attapulgite because it works well in drilling fluids. The clay can be present in the water in the range of from about 0.25 weight % to about 15 weight %, preferably about 0.5 weight % to about 10 weight %, and most preferably 1 weight % to 5 weight %.

According to the second embodiment of the present invention, a composition is provided which comprises, or consists essentially of, calcium chloride, an acrylamide-containing polymer, a polypropylene glycol, water, and optionally a polysaccharide. The scope of the acrylamide-containing polymer, polypropylene glycol, and polysaccharide is the same as that disclosed in the first embodiment of the invention.

The weight percent of the individual components of the composition, according to the second embodiment of the present invention, can be any weight percent so long as the additive composition can increase the viscosity, or control the water loss, or inhibit the drill solids, or combinations of any two or more thereof, of a water-based fluid and can vary widely depending on the desired applications. Generally the additive of the present invention can contain calcium chloride in the range of from about 2,000 to about 250,000, preferably from about 5,000 to about 250,000, more preferably from about 10,000 to about 250,000, even more preferably from about 25,000 to about 200,000, and most preferably from 50,000 to 200,000 mg/l; the acrylamide-containing polymer in the range of from about 0.01 to about 10, preferably from about 0.05 to about 5, and most preferably from 0.1 to 3 weight %; the polypropylene glycol polymer is present in the range of from about 0.01 to about 20, preferably from about 0.05 to about 15, and most preferably from 0.1 to 10 weight %; and the polysaccharide is present in the range of from about 0.01 to about 10, preferably from about 0.05 to about 5, and most preferably from 0.1 to 3 weight %. Water makes up the rest of the additive composition.

The composition of the second embodiment of the present invention can also be made by a variety of mixing means known to one skilled in the art such as, for example, blending. The individual components can be mixed in any order.

According to the third embodiment of the present invention, a process for treating subterranean formations comprises contacting the formation with a composition which comprises, or consists essentially of, calcium chloride, an acrylamide-containing polymer, a polypropylene glycol, water, and optionally a polysaccharide. The scope of the acrylamide-containing polymer, polypropylene glycol, and polysaccharide is the same as that disclosed in the first embodiment of the invention.

The weight percent of the individual components of the composition used in the third embodiment of the present invention can be any weight percent so long as the additive can increase the viscosity, or control the water loss, or inhibit the drill solids, or combinations of any two or more thereof, of a water-based fluid and can vary widely depending on the desired applications. Generally the additive of the present invention can contain calcium chloride in the range of from about 2,000 to about 250,000, preferably from about 5,000 to about 250,000, more preferably from about 10,000 to about 250,000, even more preferably from about 25,000 to about 200,000, and most preferably from 50,000 to 200,000 mg/l; the acrylamide-containing polymer in the range of from about 0.01 to about 10, preferably from about 0.05 to about 5, and most preferably from 0.1 to 3 weight %; the polypropylene glycol polymer is in the range of from about 0.01 to about 20, preferably from about 0.05 to about 15, and most preferably from 0.1 to 10 weight %; and the polysaccharide in the range of from about 0.01 to about 10, preferably from about 0.05 to about 5, and most preferably from 0.1 to 3 weight %. Water makes up the rest of the additive composition.

The composition used in the third embodiment of the present invention can also be made by a variety of mixing means known to one skilled in the art such as, for example, blending. The individual components can be mixed in any order.

The additive and/or water-based composition can be used in well treating, drilling, workover, or completion fluids in oil field operations by those skilled in the art. Generally, the liquid additive composition can be used in any drilled wells having a temperature in the range of from about 50° F. to about 500° F., preferably 75° F. to 400° F.

The following specific examples are intended to illustrate the advantages of the present invention and are not intended to unduly limit the scope of the invention.

EXAMPLE I

This example illustrates that an acrylamide-containing polymer having repeat units derived from at least two monomers has the properties of inhibiting drill solids and increasing viscosity at high temperature.

The runs were conducted by adding 93 grams of calcium chloride to 327 ml of tap water in glass quart jars then followed by mixing for 2 minutes. Unless otherwise indicated, a Multimixer was used for mixing and calcium chloride having activity of approximately 75% was used in all runs. While mixing the $CaCl_2$ fluid samples, polymer shown in Table I was added and then all samples were mixed for about 1.5 hours. To each sample, 3 balls (each ball prepared from 5 grams of wet drilled solids from a North Sea well) were added to the jars, the jars were capped, and then all samples were rolled at 150° F. for about 16 hours. After cooling to about 80° F., the balls were separated by screening the samples through a standard 4 mesh screen. The balls were reweighed after they were wiped with paper towels. The fluid samples were tested for viscosity at about 80° F. according to the API RP 13B-1 procedure. Drill solid inhibition was calculated as follows:

Inhibition (%)=(Weight of 3 balls after rolling+15)×100

The results are shown in Table I. The abbreviations used in Table I are: AMPS, sodium 2-acrylamide-2-methylpropanesulfonate; NVP, N-vinyl-2-pyrrolidone; and Na-acrylate, sodium acrylate.

TABLE I

| Run | Polymer (gram)[a] | AV[b] | Inhibition |
|---|---|---|---|
| 1 | None | 2.0 | 00% |
| 2 | Kelco's XC ® Polymer (2.0) | 19.5 | 30% |
| 3 | Kem-Seal from INTEQ (5.0) | 6.0 | 00% |
| 4 | #0 (5.0) | 16.5 | 31% |
| 5 | #1 (5.0) | 30.5 | 108% |
| 6 | #2 (5.0) | 34.5 | 106% |
| 7 | #3 (5.0) | 32.5 | 109% |
| 8 | #4 (5.0) | 36.5 | 100% |
| 9 | #5 (5.0) | 37.0 | 107% |
| 10 | #6 (5.0) | 13.0 | 00% |
| 11 | #7 (5.0) | 18.0 | 68% |
| 12 | #8 (5.0) | 36.0 | 107% |

[a]The polymer composition of each polymer was:
XC polymer is a xanthan gum obtained from Kelco Oil Field Group, Inc., Houston, Texas.
Kem-Seal is reported as a copolymer of AMPS and acrylic acid obtained from Baker Houghes INTEQ, Houston, Texas.
0 = copolymer of 90% AMPS and 10% NVP.
1 = copolymer of 50% Acrylamide and 50% AMPS.
2 = terpolymer of 50% Acrylamide, 40% AMPS and 10% Na-Acrylate.
3 = terpolymer of 50% Acrylamide, 40% AMPS, 8% Na-Acrylate and 2% NVP.
4 = terpolymer of 60% Acrylamide, 38% AMPS, and 2% NVP.
5 = terpolymer of 40% Acrylamide, 50% AMPS, 5% Na-Acrylate, and 5% NVP.
6 = terpolymer of 10% Acrylamide, 70% AMPS, 5% Na-Acrylate, and 15% NVP.
7 = terpolymer of 15% Acrylamide, 55% AMPS, and 30% NVP.
8 = copolymer of 60% Acrylamide and 40% AMPS.
[b]AV, apparent viscosity, cps.

The above test results show that those polymers containing 15% or more acrylamide (runs 5–9, 11 and 12) as one of the monomers, provided excellent inhibition properties in $CaCl_2$ fluids.

EXAMPLE II

This example illustrates shale inhibition of the invention composition.

The runs were carried out as follows. Five compositions shown in Table II were prepared by mixing the components shown in the Table II in quart jars. After addition of each component, the mixing was continued for about 10 minutes. After all components were mixed, the compositions were mixed using a Multimixer for about 1 hour before they were used in Test 1 and Test 2 described below.

In Test 1, about 20 ml of sample were transferred into plastic weighing dishes and 3 bentonite tablets (Volclay/Pure Gold Tablets ¼" obtained from Colloid Environmental Technologies Company, Arlington Heights, Ill.) were added to the 20 ml sample in each dish. Pictures of these dishes with tablets were taken at 30 seconds, 1 minute, 5 minutes, 6 hours, and 72 hours. These pictures showed that the bentonite tablets disintegrated in runs 21, 22, and 25 (Table II) in 5 minutes, whereas runs 23 and 24 (see Table II) showed excellent inhibiting properties by protecting the tablets for at least 72 hours.

In Test 2, about 300 ml of sample were placed in pint jars. Three (3) pieces of drilled cuttings from Ecofisk Bravo well B-103 of North Sea, after the pieces were weighed and photographed, were added to each jar. The jars were capped and then rolled 16 hours at about 176° F. in an oven. After cooling to about 80° F. the samples were screened through a 70 mesh screen. The residues recovered on the screen were kept for 30 minutes in an already heated oven and maintained at 250° F. and thereafter, weighed and photographed again.

The results of Test 2 are shown in Table II.

TABLE II

| Run[a] | Initial Weight of 3 Pieces, g | Weight of Residue, g | Cutting Recovered, %[b] |
|---|---|---|---|
| 21 | 19.60 | 2.55 | 13.0 |
| 22 | 22.37 | 2.93 | 13.1 |
| 23 | 22.38 | 17.37 | 77.6 |
| 24 | 27.31 | 11.56 | 42.3 |
| 25 | 31.45 | 5.01 | 15.9 |

[a]The compositions used are as follows:
21:350 ml of 10.5 pounds per gallon (ppg) $CaCl_2$ brine + 50% W/V NaOH solution adjusted to pH of 8.5
22:350 ml of 10.5 ppg $CaCl_2$ brine (pH 5.5).
23:350 ml of 10.5 ppg $CaCl_2$ brine (pH 5.5) + 10 g PPG 4000 + 3 g Polymer #1 (see Table I) where PPG 4000 is a polypropylene glycol having molecular weight of 4000.
24:350 ml of 10.5 ppg $CaCl_2$ brine (pH 5.5) + 3 g Polymer #1.
25:350 ml of 10.5 ppg $CaCl_2$ brine (pH 5.5) + 10 g PPG 4000.
[b]Cutting recovered, % = (weight of residue ÷ initial weight of 3 pieces) × 100.

The results show that the maximum cutting recovery of 77.6% was obtained with the fluid in 23. These results indicate that a drilling fluid similar to that in 23 can be used for drilling water-sensitive formations because it prevents disintegration of "gumbo" cuttings.

EXAMPLE III

This example illustrates the rheology and fluid loss of drilling fluids using the inventive composition.

The runs were carried out as follows. Five compositions shown in Table III were prepared by mixing the component shown in the Table in quart jars. After addition of each component, the contents of the jar were mixed for about 10 minutes. Before the addition of OCMA clay to represent drill solids, all mixed fluids were mixed for about one hour to simulate field condition. After addition of OCMA clay and mixing for 10 minutes, the compositions were tested initially at about 83° F. according to the API RP 13B-1 procedure. These test results are presented in Table III under "Initial Results". The compositions were then rolled for 16 hours in capped jars at 176° F., cooled to about 80° F., and retested after the compositions were mixed for 5 minutes. These test results are represented in Table III under "Results After Rolling at 176° F.".

TABLE III

| | Initial Results | | | Results After Rolling at 176° F. | | | |
|---|---|---|---|---|---|---|---|
| Run[a] | 600/300[b] | AV[c] | PV[d]/YP[e] | 600/300[b] | AV[c] | PV[d]/YP[e] | FL[f] |
| 31 | 11/6 | 5.5 | 5/1 | 12/6 | 6 | 6/0 | 340 |
| 32 | 24/12 | 12.0 | 12/0 | 24/12 | 12 | 12/0 | 56.4 |
| 33 | 28/14 | 14.0 | 14/0 | 28/14 | 14 | 14/0 | 20.4 |

TABLE III-continued

| | Initial Results | | | Results After Rolling at 176° F. | | | |
|---|---|---|---|---|---|---|---|
| Run[a] | 600/300[b] | AV[c] | PV[d]/YP[e] | 600/300[b] | AV[c] | PV[d]/YP[e] | FL[f] |
| 34 | 30/15 | 15.0 | 15/0 | 40/20 | 20 | 20/0 | 142 |
| 35 | 37/19 | 18.5 | 18/1 | 48/24 | 24 | 24/0 | 44 |

[a]The composition of each run is as follows:
31: 340 ml of 10.5 ppg CaCl₂ brine (pH 5.5) + 10 g PPG 4000 + 15 g OCMA clay which is primarily a montmorillonite clay.
32: 350 ml of 10.5 ppg CaCl₂ brine (pH 5.5) + 3 g Polymer #1 (run 5) in Table I OCMA clay.
33: 340 ml of 10.5 ppg CaCl₂ brine (pH 5.5) + 10 g PPG 4000 + 3 g Polymer #1 in Table I + 15 g OCMA clay.
34: 350 ml of 10.5 ppg CaCl₂ brine (pH 5.5) + 5 g Polymer #1 in Table I + 15 g OCMA clay.
35: 340 ml of 10.5 ppg CaCl₂ brine (pH 5.5) + 10 g PPG 4000 + 5 g Polymer #1 in Table I + 15 g OCMA clay.
[b]Readings in this column refer to the readings of a direct-indicating 115-volt motor-driven viscometer (API RP 13B-1, June 1, 1990, Section 2-4a) at 600/300 rpm, respectively.
[c]AV - apparent viscosity, cps.
[d]PV - plastic viscosity, cps.
[e]YP - yield point, lbs/100 sq. ft.
[f]FL - fluid loss at room temperature, ml/30 minutes.

These results show that drilling fluids containing PPG 4000 and Polymer #1 (runs 33 and 35) had higher viscosities and lower fluid loss than the fluids containing either PPG 4000 (run 31) or Polymer #1 (runs 32 and 34).

EXAMPLE IV

This example illustrates that drilling fluids containing the inventive compositions which contain blends of an acrylamide-containing copolymer and hydroxyethyl cellulose have lower fluid loss than the drilling fluids that contain only either the copolymer or hydroxyethyl cellulose.

The runs were carried out by mixing the components shown in Table IV to prepare approximately 350 ml of each of nine drilling fluid compositions in quart jars. The mixing time after the addition of each component is shown in Table IV. Bentonite clay represented drill solids. Polymers were added before adding bentonite to simulate the field use. After the mixing was completed, the fluids were kept at about 75° F. They were then mixed for 5 minutes, transferred into pint jars, and tested at about 85° F. These test results are reported under "Initial Results" in Table V. The fluids were then rolled for about 16 hours in sealed pint jars in an oven at 160° F., cooled to about 85° F., and retested after mixing for 5 minutes. These test results are reported in Table V under "After Rolling at 160° F.".

TABLE IV

| Run | Materials Used |
|---|---|
| 41 | 307 ml tap water + 113 g CaCl₂ (5 minutes) + 2 g PPG 4000 (5 minutes) + 5 g attapulgite clay (90 minutes) + 10 g bentonite clay (30 minutes) |
| 42 | 307 ml tap water + 113 g CaCl₂ (5 minutes) + 2 g PPG 4000 (5 minutes) + 5 g attapulgite clay (30 minutes) + 0.5 g Polymer #1[a] (60 minutes)+ 10 g bentonite clay (30 min) |
| 43 | Same as #42 except 1.0 g Polymer #1 |
| 44 | Same as #42 except 2.0 g Polymer #1 |
| 45 | Same as #42 except 0.5 g HEC 25[b] in place of Polymer #1 was used |
| 46 | Same as #43 except 1.0 g HEC 25 in place of Polymer #1 was used |
| 47 | Same as #44 except 2.0 g HEC 25 in place of Polymer #1 was used |
| 48 | Same as #44 except 2.0 g Blend-A[c] in place of Polymer #1 was used |

TABLE IV-continued

| Run | Materials Used |
|---|---|
| 49 | Same as #44 except 2.0 g Blend-B[d] in place of Polymer #1 was used. |

[a]See Table I for Polymer #1 composition.
[b]HEC 25 is hydroxyethyl cellulose obtained from Union Carbide Corporation.
[c]Blend-A is a blend of 0.5 g Polymer #1 and 0.5 g HEC 25.
[d]Blend-B is a blend of 1.5 g Polymer #1 and 0.5 g HEC 25.

TABLE V

| | Initial Results | | | After Rolling at 160° F. | | |
|---|---|---|---|---|---|---|
| Run | AV[a] | PV/YP[a] | FL[a] | AV[a] | PV/YP[a] | FL[a] |
| 41 | 4.5 | 4/1 | >200 | 4.5 | 4/1 | 207 |
| 42 | 5.5 | 5/1 | >100 | 6.0 | 6/0 | 142 |
| 43 | 8.0 | 7/2 | >100 | 7.5 | 7/1 | 98.6 |
| 44 | 11.5 | 10/3 | >50 | 10.5 | 9/3 | 73.4 |
| 45 | 10.0 | 9/2 | 12.6 | 9.5 | 9/1 | 14.3 |
| 46 | 20.5 | 14/13 | 7.2 | 19.0 | 14/10 | 8.6 |
| 47 | 55.5 | 26/59 | 5.4 | 55.5 | 26/59 | 4.8 |
| 48 | 11.0 | 10/2 | 7.2 | 9.5 | 9/1 | 8.9 |
| 49 | 15.5 | 14/3 | 3.8 | 14.5 | 13/3 | 3.8 |

[a]See Table III.

Fluid loss results of runs 48 and 49 were unexpected. From test results shown in runs 42, 43, 45, and 46, 1.0 gram of Blend-A (run 48) was expected to give higher fluid loss than the results shown. Similarly, Blend-B (run 49) provided lower fluid loss than the fluid loss expected from test results shown in runs 44, 45, and 47.

EXAMPLE V

This example illustrates that the inventive composition containing an acrylamide-containing copolymer, HEC Polymer, and PPG 4000 has higher shale inhibition than the composition without PPG 4000 when used in drilling fluids.

The runs were carried out as follows. Approximately 350 ml of each of four drilling fluid compositions shown in Table VI were prepared by mixing the materials in quart jars. The mixing time after the addition of each material is shown in Table VI. After mixing all materials, the jars were capped and kept at about 75° F. for 16 hours. The fluids were then stirred for 10 minutes, transferred into pint jars, and tested for viscosity. Bentonite tablets described in Example II were then weighed and placed in each fluid. After the jars were capped, the fluids were rolled for 2 hours in a roller oven at 150° F. Residues of the bentonite tablets were then separated by screening the fluids through a 20 mesh screen. The residues were washed gently with tap water, dried at 250° F., and weighed. These test results are provided in Table VII.

The test results in Table VII show that the drilling fluids containing the inventive composition (run 52) provides the maximum shale inhibition. The fluid composition (run 53) that contained all components of run 52 except the acrylamide-containing polymer provided the least inhibition. Run 54, which contained NaCl brine instead of CaCl₂ brine in the fluid composition, is more inhibitive than the composition that did not contain PPG 4000 (run 51). These test results demonstrate that the drilling fluid similar to run 52 containing the invention composition can be used for drilling water-sensitive formations where many water-based drilling fluids cause problems.

TABLE VI

| Run | Materials Used |
|-----|----------------|
| 51 | 307 ml tap water + 113 g $CaCl_2$ (10 minutes) + 5 g attapulgate clay (10 minutes) + 3 g Blend-C (30 minutes) |
| 52 | 299 ml tap water + 110 g $CaCl_2$ (10 minutes) + 10 g PPG 4000 (10 minutes) + 5 g attapulgite clay (10 minutes) + 3 g Blend-C[a] (30 minutes) |
| 53 | 299 ml tap water + 110 g $CaCl_2$ (minutes) + 10 g PPG 4000 (10 minutes) + 5 g attapulgite clay (10 minutes) + 1 g HEC 25 (30 minutes) |
| 54 | 299 ml tap water + 110 g NaCl (10 minutes) +10 g PPG 4000 (10 minutes) + 5 g attapulgite clay (10 minutes) + 3 g Blend-C (30 minutes) |

[a]Blend-C = Blend of 75 weight % Polymer #1 (see Table I) and 25 weight % HEC 25.

TABLE VII

| Run | AV | Weight of Bentonite Tablets, g | | Weight of Residue | Inhibition, % |
|-----|------|-------|------|------|------|
|     |      | W1    | W2   | W3   |      |
| 51 | 31.5 | 10.28 | 9.59 | 8.45 | 88.1 |
| 52 | 39.5 | 10.25 | 9.56 | 9.33 | 97.6 |
| 53 | 27.0 | 10.18 | 9.50 | 7.59 | 79.9 |
| 54 | 39.0 | 10.21 | 9.53 | 8.74 | 91.7 |

Moisture content of Bentonite Tablets was 93.3 weight %
W2 = 0.933 × W1
Inhibition, % = (W3/W2) × 100

EXAMPLE VI

This example illustrates that the drilling fluid containing the invention composition which contains an acrylamide-containing copolymer, HEC Polymer, and PPG 4000 is less corrosive toward metals than the composition which does not contain PPG 4000.

To conduct the runs, approximately 350 ml of each of six drilling fluid compositions shown in Table VIII were prepared by mixing the materials in quart jars. After each material was added, the mixing was continued for 10 minutes. After all materials were mixed, the jars were capped and kept at room temperature (about 25° C.) for about 18 hours. The fluid compositions were then stirred 10 minutes and, immediately after the stirring, approximately 210 ml of each sample was transferred into 215 ml glass bottles for measuring corrosion rate according to the Wheel test which is well known to one skilled in the art. The conditions used for the corrosion rate test were: Test vapor—ambient, time (T)—28 hours, and temperature—120° F. Corrosion coupons:Material—carbon steel; density(D)—7.88 g/cc; area (A)—calculated; length—3.0 inches; thickness—0.005 inch; and total used—2. Initial and final weights of the two corrosion coupons in each run were measured to determined weight loss ($\Delta W$).

TABLE VIII

| Run | Materials Used | MPY[a] | pH |
|-----|----------------|------|-----|
| 61 | 245 ml tap water + 90 g $CaCl_2$ + 4 g Blend-C[b] | 11.3 | 8.2 |
| 62 | 245 ml tap water + 90 g $CaCl_2$ + 4 g Blend-C + 2 g PPG 4000 | 5.9 | 8.0 |
| 63 | 245 ml tap water + 90 g $CaCl_2$ + 4 g Blend-C + 2 g PEG 8000[b] | 5.6 | 7.9 |
| 64 | 245 ml tap water + 90 g $CaCl_2$ + 4 g attapulgite clay + 4 g Blend-C + 8 g bentonite clay | 16.9 | 7.6 |
| 65 | 245 ml tap water + 90 g $CaCl_2$ + 4 g attapulgite clay + 0.4 g PPG 4000 + 4 g Blend-C + 8 g bentonite clay | 13.5 | 7.0 |
| 66 | 245 ml tap water + 90 g $CaCl_2$ + 4 g attapulgite clay + 0.4 g PEG 8000[c] + 4 g Blend-C + 8 g bentonite clay | 17.9 | 6.9 |

[a]MPY = Corrosion rate in mills per year calculated as:

$$MPY = \frac{534\Delta W}{DAT}$$

[b]See Table VI.
[c]PEG 8000 = Polyglycol E8000, a polyethylene glycol having molecular weight of about 8000, obtained from Dow Chemicals.

As shown in Table VIII, the corrosion rate was lower in fluids containing PPG 4000 (runs 62 and 65) than the fluids which did not contain PPG 4000 (runs 61 and 64). The drilling fluid composition containing PEG 8000 (run 66) as described in U.S. Pat. No. 4,425,241 was very corrosive as compared to the PPG 4000 containing drilling fluid (run 65).

EXAMPLE VII

This example illustrates that drilling fluid composition containing an acrylamide-containing copolymer, HEC Polymer, and PPG 4000 has lower fluid loss and higher viscosity than the fluid composition without PPG 4000.

The runs were carried out as follows. Five drilling fluid compositions shown in Table IX were prepared by mixing the materials in quart jars. After addition of each material, the mixing was continued for 10 minutes. After all materials were mixed, the jars were capped and rolled for 2 hours in a roller oven at 100° F. After cooling to about 80° F., the fluids were mixed for 5 minutes, transferred into pint jars, and tested at about 90° F. These test results are provided under "Initial Results" in table X. The jars were then capped and static aged for 16 hours at 176° F. After cooling to about 80° F. and mixing 5 minutes, the fluids were retested at 90° F. These test results are provided under "After Aging at 176° F." in Table X.

The results in Table X show that the drilling fluid composition containing the inventive composition (run 72), provided lower fluid loss and higher rheology than the fluid without PPG 4000 (run 73). The composition of run 74, which contained PPG 4000 but did not contain either HEC or Polymer #1, produced unacceptably high fluid loss. Similar to test results in Example III, the fluid composition of run 75, which contained Polymer #1 and PPG 4000, gave better fluid loss than run 74. The test results of runs 71 and 72 further indicate that the addition of attapulgite clay significantly lowered fluid loss.

TABLE IX

| Run | Materials Used |
|-----|----------------|
| 71 | 299 ml tap water + 110 g $CaCl_2$ + 10 g PPG 4000 + 4 g Blend-C[a] +10 g bentonite clay |
| 72 | 299 ml tap water + 110 g $CaCl_2$ + 5 g attapulgite clay + 10 g PPG 4000 + 4 g Blend-C + 10 g bentonite clay |
| 73 | 307 ml tap water + 113 g $CaCl_2$ + 5 g attapulgite clay + 4 g Blend-C + 10 g bentonite clay |

TABLE IX-continued

| Run | Materials Used |
|---|---|
| 74 | 299 ml tap water + 110 g $CaCl_2$ + 5 g attapulgite clay + 10 g PPG 4000 + 10 g bentonite clay |
| 75 | 299 ml tap water + 110 g $CaCl_2$ + 5 g attapulgite clay + 10 g PPG 4000 + 4 g Polymer #1[b] + 10 g bentonite clay |

[a]See Table VI
[b]See Table I.

TABLE X

| | Initial Results | | | After Aging at 176° F. | | | |
|---|---|---|---|---|---|---|---|
| Run | AV[a] | PV/YP[a] | FL[a] | AV | PV/YP | FL | HTHPFL[b] |
| 71 | 54.5 | 28/53 | 49.6 | 52.5 | 29/47 | 43.3 | — |
| 72 | 53.5 | 31/45 | 4.2 | 48.5 | 30/37 | 3.5 | 12.8 |
| 73 | 49.0 | 30/38 | 6.3 | 41.0 | 26/30 | 6.6 | 18.4 |
| 74 | 12.0 | 12/0 | >100 | — | — | — | — |
| 75 | 27.0 | 23/8 | 45.4 | 25.0 | 22/6 | 46.2 | — |

[a]See Table III.
[b]HTHPFL (high temperature high pressure fluid loss) - fluid loss measured at 200° F. and 500 psi differential pressure.

EXAMPLE VIII

This example illustrates that drilling fluid composition containing attapulgite clay provides lower fluid loss than the composition containing bentonite clay. Furthermore, if attapulgite was added to the composition before the acrylamide-containing and HEC polymers were added, the fluid loss was much lower.

The runs were carried out as follows. Six drilling fluid compositions shown in Table XI were prepared and tested according to the test procedures described in Example VII. These test results are shown in Table XII.

Test results in table XII show that the drilling composition containing attapulgite clay (run 81) had lower fluid loss than the composition that contained bentonite clay (run 82). Both clays were helpful for reducing fluid loss, which is evident from the test results of runs 81, 82, and 83. The fluid test results of runs 81, 84, 85, and 86 indicate that the compositions had the lowest fluid loss when attapulgite was mixed in the compositions before the addition of polymers as in runs 81 and 85.

TABLE XI

| Run | Materials Used |
|---|---|
| 81 | 299 ml tap water + 90 g $CaCl_2$ + 2 g PPG 4000 + 5 g attapulgite clay + 4 g Blend-C + 10 g OCMA clay |
| 82 | 299 ml tap water + 90 g $CaCl_2$ + 2 g PPG 4000 + 5 g bentonite clay + 4 g Blend-C + 10 g OCMA clay |
| 83 | 299 ml tap water + 90 g $CaCl_2$ + 2 g PPG 4000 + 4 g Blend-C[a] + 10 g OCMA clay |
| 84 | 299 ml tap water + 90 g $CaCl_2$ + 2 g PPG 4000 + 4 g Blend-C + 5 g attapulgite clay + 10 g OCMA clay |
| 85 | 307 ml tapwater + 113 g $CaCl_2$ + 2 g PPG 4000 + 5 g attapulgite clay + 3 g Blend-C + 10 g bentonite clay |
| 86 | 307 tap water + 113 g $CaCl_2$ + 2 g PPG 4000 + 3 g Blend-C + 5 g attapulgite clay + 10 g bentonite clay |

[a]See Table VI.

TABLE XII

| | Initial Results | | | After Aging at 176° F. | | |
|---|---|---|---|---|---|---|
| Run | AV[a] | PV/YP[a] | FL[a] | AV | PV/YP | FL |
| 81 | 45.5 | 26/39 | 4.6 | 41.5 | 25/33 | 3.5 |
| 82 | 44.5 | 25/39 | 6.1 | 46.5 | 27/39 | 6.0 |
| 83 | 46.5 | 25/43 | 7.9 | 47.0 | 27/40 | 9.2 |
| 84 | 50.5 | 27/47 | 5.7 | 46.5 | 27/39 | 5.3 |
| 85 | 30.5 | 22/17 | 3.9 | 26.5 | 21/11 | 3.3 |
| 86 | 32.0 | 21/22 | 7.2 | 29.5 | 21/17 | 6.2 |

[a]See Table III.

EXAMPLE IX

This example illustrates that calcium tolerant polymers such as carboxymethyl hydroxyethyl cellulose (CMHEC) can also be used for fluid loss control in drilling fluids.

The runs were conducted as follows. Two drilling fluid compositions in Table XIII were prepared and tested according to the procedure described in Example IV. Run 91 was the same as run 47. As shown in Table XIII, the fluid containing CMHEC (run 92) had lower viscosity than the HEC-containing fluid (run 91), even though both fluids gave very low fluid loss. These results indicate that any calcium tolerant polymer can be used in the inventive drilling fluid.

TABLE XIII

| | Initial Results | | | After Rolling at 160° F. | | |
|---|---|---|---|---|---|---|
| Run[a] | AV[b] | PV[b]/YP[b] | FL | AV | PV/YP | FL |
| 91 | 55.5 | 26/59 | 5.4 | 55.5 | 26/59 | 4.8 |
| 92 | 8.0 | 8/0 | 5.4 | 8.0 | 8/0 | 5.2 |

[a]Run 91 was the same as run 47 and run 92 was the same as run 91 except 2.0 g CMHEC (Tylodrill ™ obtained from Hoechst Aktiengesellschaft, Frankfurt, Germany) was used in place of HEC 25.
[b]See Table III.

The results shown in the above examples clearly demonstrate that the present invention is well adapted to carry out the objects and attain the ends and advantages mentioned as well as those inherent therein. While modifications may be made by those skilled in the art, such modifications are encompassed within the spirit of the present invention as defined by the disclosure and the claims.

That which is claimed is:

1. A process comprising contacting a subterranean formation with a composition which comprises an acrylamide-containing polymer having repeat units derived from a acrylamide and at least one olefinic comonomer; and a polypropylene glycol wherein said acrylamide-containing polymer and said polypropylene glycol are each present in a sufficient amount effective to control fluid loss of a water-based fluid containing said composition; the mole percent of acrylamide in said acrylamide-containing polymers is in the range of from about 15 to about 90%; and said polypropylene glycol has a molecular weight in the range of from about 1,200 to about 5,000.

2. A process according to claim 1 wherein the mole percent of said acrylamide in said acrylamide-containing polymer is in the range of from about 20 to about 85% and said olefinic comonomer is selected from the group consisting of R—C(R)=C(R)—C(O)—C(R)(R), R—C(R)=C(R)—C(O)—N(R)—Y—R, R—C(R)=C(R)—C(O)—G—Y—Z, R—C(R)=C(R)—C(O)—G—Y—W, $CH_2$=CH—C(O)—N(R)—$(CH_2)_n$—$CH_3$, and combinations of any two or more thereof wherein:

each R is independently selected from the group consisting of hydrogen, alkyl radicals, aryl radicals, aralkyl radicals, alkalkyl radicals, cycloalkyl radicals, and combinations of any two or more thereof wherein each radical can contain 1 to about 12 carbon atoms;

G is O or NH;

Y is an alkylene radical having 1 to about 10 carbon atoms;

W is an acid moiety selected from the group consisting of phosphonic acids, phosphoric acids, phosphinic acids, sulfuric acids, sulfonic acids, sulfurous acids, sulfinic acids, carboxylic acids, alkali metal salts of the acids, ammonium salts of the acids, and combinations of any two or more thereof;

Z has a formula selected from the group consisting of $N(R)(R)$, $N^+(R)(R)(R)X^-$, and combinations of any two or more thereof wherein each R is independently selected from the group consisting of hydrogen, alkyl radicals, aryl radicals, aralkyl radicals, alkalkyl radicals, cycloalkyl radicals, and combinations of any two or more thereof wherein each radical can contain 1 to about 12 carbon atoms;

X is an inorganic anion selected from the group consisting of sulfonates, sulfinates, sulfates, phosphonates, phosphinates, phosphates, halides, nitrates, and combinations of any two or more thereof; and n is a number of from 0 to about 10.

3. A process according to claim 2 wherein Y is an alkylene radical having 1 to 4 carbon atoms.

4. A process according to claim 1 wherein said olefinic comonomer is selected from the group consisting of vinyl acetate, vinylpyridine, styrene, methyl methacrylate, acryloylpiperazine, methacryloylpiperazine, methacryloylmorpholine, methacrylamide, acrylonitrile, methacrylic acid, ammonium salt of methacrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, vinylsulfonic acids, alkali metal salts of vinylsulfonic acid, styrene sulfonic acid, alkali metal salts of styrene sulfonic acid, N-vinyl-2-pyrrolidone, and combinations of any two or more thereof.

5. A process according to claim 1 wherein said olefinic comonomer is selected from the group consisting of 2-acrylamido-2-methylpropane sulfonic acid, alkali metal salts of 2-acrylamido-2-methylpropane sulfonic acid, N-vinyl-2-pyrrolidone, and combinations of any two or more thereof.

6. A process according to claim 1 wherein said acrylamide-containing polymer is selected from the group consisting of copolymers of N-vinyl-2-pyrrolidone and acrylamide, terpolymers of sodium 2-acrylamide-2-methylpropanesulfonate, acrylamide and N-vinyl-2-pyrrolidone, copolymers of sodium 2-acrylamido-2-methyl-2-propanesulfonate and acrylamide, and combinations of any two or more thereof.

7. A process according to claim 1 wherein said polypropylene glycol has a molecular weight in the range of from 1,500 to 4,500.

8. A process according to claim 1 wherein the mole percent of said acrylamide in said acrylamide-containing polymer is in the range of from 20 to 80%.

9. A process according to claim 1 wherein said composition further comprises a polysaccharide selected from the group consisting of starches, gums, celluloses, biopolysaccharides, and combinations of two or more thereof.

10. A process according to claim 9 wherein said polysaccharide is selected from the group consisting of carboxymethylcellulose, methylcellulose, carboxymethyl hydoxyethyl cellulose, hydroxypropyl methylcellulose, hydroxypropyl cellulose, hydroxyethyl cellulose, ethylhydroxy cellulose, and combinations of any two or more thereof.

11. A process according to claim 9 wherein said polysaccharide is selected from the group consisting of hydroxyethyl cellulose and carboxylmethyl hydroxyethyl cellulose.

12. A process according to claim 1 wherein said composition further comprises calcium chloride.

13. A process according to claim 12 wherein said composition further comprises water selected from the group consisting of pure water, regular tap water, a solution, a suspension, and combinations of two or more thereof.

14. A process according to claim 13 wherein said solution and said suspension comprise a substance selected from the group consisting of salts, clays, and combinations thereof.

15. A process according to claim 14 wherein said clay is selected from the group consisting of kaolinite, halloysite, vermiculite, chlorite, attapulgite, smectite, montmorillonite, illite, saconite, sepiolite, palygorskite, Fuller's earth, and combinations of any two or more thereof.

16. A process according to claim 14 wherein said clay is attapulgite.

17. A process according to claim 9 wherein said composition further comprises calcium chloride.

18. A process according to claim 17 wherein said composition further comprises water selected from the group consisting of pure water, regular tap water, a solution, a suspension, and combinations of two or more thereof.

19. A process according to claim 18 wherein said solution and said suspension comprise a substance selected from the group consisting of salts, clays, and combinations thereof.

20. A process according to claim 10 wherein said composition further comprises calcium chloride.

21. A process according to claim 20 wherein said composition further comprises water selected from the group consisting of pure water, regular tap water, a solution, a suspension, and combinations of two or more thereof.

22. A process according to claim 21 wherein said solution and said suspension comprise a substance selected from the group consisting of salts, clays, and combinations thereof.

23. A process according to claim 11 wherein said composition further comprises calcium chloride.

24. A process according to claim 23 wherein said composition further comprises water selected from the group consisting of pure water, regular tap water, a solution, a suspension, and combinations of two or more thereof.

25. A process according to claim 24 wherein said solution and said suspension comprise a substance selected from the group consisting of salts, clays, and combinations thereof.

26. A process according to claim 13 wherein said composition comprises: calcium chloride in the range of from about 2,000 to about 250,000 mg/l; acrylamide-containing polymer in the range of from about 0.01 to about 10 weight %; and polypropylene glycol polymer in the range of from about 0.01 to about 20 weight %.

27. A process according to claim 13 wherein said composition comprises: calcium chloride in the range of from 50,000 to 200,000 mg/l; acrylamide-containing polymer in the range of from 0.1 to 3 weight %; and polypropylene glycol polymer in the range of from 0.1 to 10 weight %.

28. A process according to claim 18 wherein said composition comprises: calcium chloride in the range of from about 2,000 to about 250,000 mg/l; acrylamide-containing polymer in the range of from about 0.01 to about 10 weight %; polypropylene glycol polymer in the range of from about 0.01 to about 20 weight %; and polysaccharide in the range of from about 0.01 to about 10 weight %.

29. A process according to claim 18 wherein said composition comprises: calcium chloride in the range of from 50,000 to 200,000 mg/l; acrylamide-containing polymer in the range of from 0.1 to 3 weight %; polypropylene glycol polymer in the range of from 0.1 to 10 weight %; and polysaccharide in the range of from 0.1 to 3 weight %.

30. A process according to claim 21 wherein said composition comprises: calcium chloride in the range of from about 2,000 to about 250,000 mg/l; acrylamide-containing polymer in the range of from about 0.01 to about 10 weight %; polypropylene glycol polymer in the range of from about 0.01 to about 20 weight %; and polysaccharide in the range of from about 0.01 to about 10 weight %.

31. A process according to claim 21 wherein said composition comprises: calcium chloride in the range of from 50,000 to 200,000 mg/l; acrylamide-containing polymer in the range of from 0.1 to 3 weight %; polypropylene glycol polymer in the range of from 0.1 to 10 weight %; and polysaccharide in the range of from 0.1 to 3 weight %.

32. A process comprising contacting a subterranean formation with a composition which is prepared by combining calcium chloride, a polypropylene glycol polymer, an acrylamide-containing polymer, a polysaccharide, and water wherein:

said acrylamide-containing polymer comprises repeat units derived from acrylamide and an olefinic comonomer selected from the group consisting of vinyl acetate, vinylpyridine, styrene, methyl methacrylate, acryloylpiperazine, methacryloylpiperazine, methacryloylmorpholine, methacrylamide, acrylonitrile, methacrylic acid, ammonium salt of methacrylic acid, alkali metal salts of methacrylic acid, 2-methacryloyloxyethyltrimethylamine, 2-acrylamido-2-methylpropane sulfonic acid, alkali metal salts of 2-acrylamido-2-methylpropane sulfonic acid, 2-methacryloyloxyethane sulfonic acid, alkali metal salts of 2-methacryloyloxyethane sulfonic acid, acryloylmorpholine, N-4-butylphenylacrylamide, 2-acrylamido-2-methylpropane dimethylammonium chloride, 2-methacryloyloxyethyldiethylamine, 3-methacrylamidopropyldimethylamine, vinylsulfonic acids, alkali metal salts of vinylsulfonic acid, styrene sulfonic acid, alkali metal salts of styrene sulfonic acid, N-vinyl-2-pyrrolidone, and combinations of any two or more thereof;

the mole percent of acrylamide in said acrylamide-containing polymer is in the range of from about 20 to about 85%;

said polypropylene glycol has a molecular weight of from about 1,200 to about 5,000;

said polysaccharide is selected from the group consisting of starches, gums, celluloses, biopolysaccharides, and combinations of two or more thereof; and said water is selected from the group consisting of pure water, regular tap water, a solution, a suspension, and combinations of two or more thereof.

33. A process according to claim 32 wherein said acrylamide-containing polymer comprises repeat units derived from the group consisting of 2-acrylamido-2-methylpropane sulfonic acid, alkali metal salts of 2-acrylamido-2-methylpropane sulfonic acid, N-vinyl-2-pyrrolidone, and combinations of any two or more thereof; and said polysaccharide is selected from the group consisting of hydroxyethyl cellulose, carboxylmethyl hydroxyethyl cellulose.

34. A process comprising contacting a subterranean formation with a composition which is prepared by combining: calcium chloride in the range of from 50,000 to 200,000 mg/l; acrylamide-containing polymer in the range of from 0.1 to 3 weight % wherein the mole percent of acrylamide in said acrylamide-containing polymer is in the range of from 20 to 80%; polypropylene glycol polymer having a molecular weight of 1,500 to 4,500 and in the range of from 0.1 to 10 weight %; polysaccharide in the range of from 0.1 to 3 weight %; and water makes up the rest of said composition.

* * * * *